United States Patent [19]

Esmay

[11] Patent Number: 4,616,517
[45] Date of Patent: Oct. 14, 1986

[54] MONOAXIAL COARSE-FINE ADJUSTING MECHANISM FOR OPTICAL INSTRUMENTS, SUCH AS MICROSCOPES

[75] Inventor: Edward N. Esmay, Webster, N.Y.

[73] Assignee: Bausch & Lomb Incorporated, Rochester, N.Y.

[21] Appl. No.: 828,585

[22] Filed: Feb. 10, 1986

Related U.S. Application Data

[63] Continuation of Ser. No. 451,901, Dec. 21, 1982, abandoned.

[51] Int. Cl.[4] ............... F16H 35/18; G02B 21/24
[52] U.S. Cl. ............... 74/10.45; 74/10.52; 74/665 B; 74/772; 350/521; 350/530
[58] Field of Search ............ 74/10.45, 10.5, 10.52, 74/10.54, 479, 216, 665 B, 772; 350/521, 530

[56] References Cited

U.S. PATENT DOCUMENTS

| | | | |
|---|---|---|---|
| 1,562,070 | 11/1925 | Baltzley | 74/798 X |
| 1,800,718 | 4/1931 | Collins et al. | 74/216 |
| 2,831,373 | 4/1958 | Weis | 74/798 X |
| 3,019,705 | 2/1962 | Wilkinson | 350/530 X |
| 3,019,707 | 2/1962 | Straat | 350/530 |
| 3,135,817 | 6/1964 | Wrigglesworth et al. | 88/39 |
| 3,260,157 | 7/1966 | Boughton | 88/39 |
| 3,370,473 | 2/1968 | Fisher | 74/10.5 X |
| 3,768,885 | 10/1973 | Boughton et al. | 350/518 |
| 3,994,177 | 11/1976 | Cappelle et al. | 74/10.45 X |
| 4,083,256 | 8/1976 | Shio | 74/10.54 X |
| 4,173,902 | 11/1979 | Shio | 74/10.52 |
| 4,445,758 | 5/1984 | Emmel | 74/479 X |
| 4,482,221 | 11/1984 | Clark | 74/665 B |

FOREIGN PATENT DOCUMENTS 926815 5/1955 Fed. Rep. of Germany ...... 350/521

*Primary Examiner*—Kenneth J. Dorner
*Assistant Examiner*—Joseph M. Rolnicki
*Attorney, Agent, or Firm*—DeWitt M. Morgan; John S. Norton

[57] ABSTRACT

A monoaxial coarse-fine adjusting apparatus for optical instruments has a pair of friction wheels whose peripheries are in engagement with the fine adjusting shaft. The axles to which the friction wheels are mounted are received in slots formed in the coarse shaft. The coarse adjusting knob has a surface which the friction wheel axles bear against. A pair of springs are provided which accommodate for torsion and backlash. Rotation of the coarse knob directly rotates the coarse shaft. Rotation of the fine knob rotates the friction wheels in a planetary fashion. The friction wheel axles which are received in the slots in the coarse shaft, drive the coarse shaft an amount which is proportional to the rotation of the fine knob.

9 Claims, 3 Drawing Figures

MONOAXIAL COARSE-FINE ADJUSTING MECHANISM FOR OPTICAL INSTRUMENTS, SUCH AS MICROSCOPES

This is a continuation of co-pending application Ser. No. 451,901 filed on Dec. 21, 1982, now abandoned.

BACKGROUND OF THE INVENTION

1. Field of the Invention

This invention relates to a monoaxial coarse and fine adjusting mechanism for an optical instrument such as a microscope.

2. Description of the Prior Art

Generally, the focusing requirements of precision instruments such as microscopes require both a coarse adjusting mechanism and a fine adjusting mechanism. The coarse adjusting mechanism allows the operator to rapidly raise or lower the stage or nosepiece assembly to roughly bring the specimen being viewed into focus. The fine adjusting mechanism is then rotated to bring the specimen into sharp focus.

It is common to have such coarse and fine adjusting mechanisms coaxially mounted. Although these mechanisms are coaxially mounted to each other, they operate independently of each other. That is, rotation of the coarse adjusting knob would rotate a coarse adjusting shaft which is mechanically connected directly to, for instance, a stage mechanism by a rack and pinion assembly. Rotation of the knob, therefore, causes gross movement of the stage mechanism. However, when the fine adjusting knob is rotated, it rotates a fine adjusting shaft that in turn has direct mechanical connection to the stage mechanism which is separate and distinct from the coarse mechanism. In essence, although the coarse and fine adjusting mechanisms are coaxially mounted, two complete and separate adjusting mechanisms are required to accomplish coarse and fine adjustments.

Several efforts have been made which attempt to overcome the problems inherent in such dual adjusting mechanisms. However, these devices generally result in a mechanism which is difficult to manufacture and assemble and, accordingly, costly to produce.

One such attempt is shown by L. A. Wilkinson in U.S. Pat. No. 3,019,705 which issued Feb. 6, 1962. In this mechanism a monoaxial coarse-fine adjusting mechanism is shown which utilizes a single gear and rack to accomplish both coarse and fine movement. Rotation of the coarse knob transfers directly into coarse movement of the adjustable member, which in this instance is the stage. Rotation of the fine knob rotates an eccentric member which in turn rotates a spur gear. The spur gear meshes with a pair of sun gears one of which is mounted to the knob while the other is mounted to the adjusting shaft. The sun gears have different numbers of teeth. One of the sun gears is driven and one is held stationary. Due to the difference between those two gears the amount of fine movement may be controlled. However, this system requires gears which are costly to produce. Further, tolerances must be closely kept in order to produce desired results. Still further, this apparatus does not appear to have any provisions for removing backlash from the system.

A further coaxial coarse-fine adjusting mechanism may be found in U.S. Pat. No. 3,019,707 which issued Feb. 6, 1962 to H. W. Straat. The mechanism consists of a worm gear mounted to the coarse shaft which directly drives a pinion gear mounted to the stage mechanism. The fine shaft has a nut captured by the coarse worm gear. Rotation of the fine shaft moves the nut linearly such that fine adjustment can be made.

U.S. Pat. No. 3,768,885 issued Oct. 30, 1973 to O. W. Boughton et al discloses a further microscope focusing system. The coarse-fine focusing mechanism in this device comprises a movable nosepiece which is connected to a linkage that is in direct engagement with a rotatable cam. The cam is rotated by a reduction gear system in order to accomplish fine movement. The cam and the gear system are both rotated together to effect coarse movement. The reduction gear system is comprised of a plurality of gears and pinions enclosed in a gear box. The gears and pinions are expensive to manufacture and assemble. In order to function properly, the gears and pinions must have close tolerances. Accordingly, these necessities add to the complexity and cost of the final product.

Further coarse-fine adjusting systems may be found in U.S. Pat. Nos. 3,135,817 and 3,260,157. These systems feature compound cams and linkage. The cam would be directly rotated to accomplish coarse adjustment and axially translated for fine adjustment.

SUMMARY OF THE INVENTION

The present invention is directed to a monoaxial coarse-fine adjusting mechanism. Rotation of either the coarse knob or the fine knob rotates, either directly or indirectly, a shaft which effectively raises or lowers the member being adjusted, such as a stage assembly or nosepiece assembly. Rotation of the coarse focus knob directly rotates a coarse focus shaft. When the fine focus knob is rotated, it rotates a pair of rollers which are frictionally engaged to a fine focus shaft. The friction rollers are supported by axles which are received in slots formed in the coarse focus shaft. The axles are further supported by a bearing ring on the coarse knob. Therefore, when the fine focus shaft is rotated the friction rollers are also caused to rotate and by so doing the axles move in a planetary fashion about the fine focus shaft. Thus, the adjusting shaft to which they are tied is caused to rotate an amount which is proportional to the rotation of the fine focus knob.

DESCRIPTION OF THE PREFERRED EMBODIMENT

Figure 1:
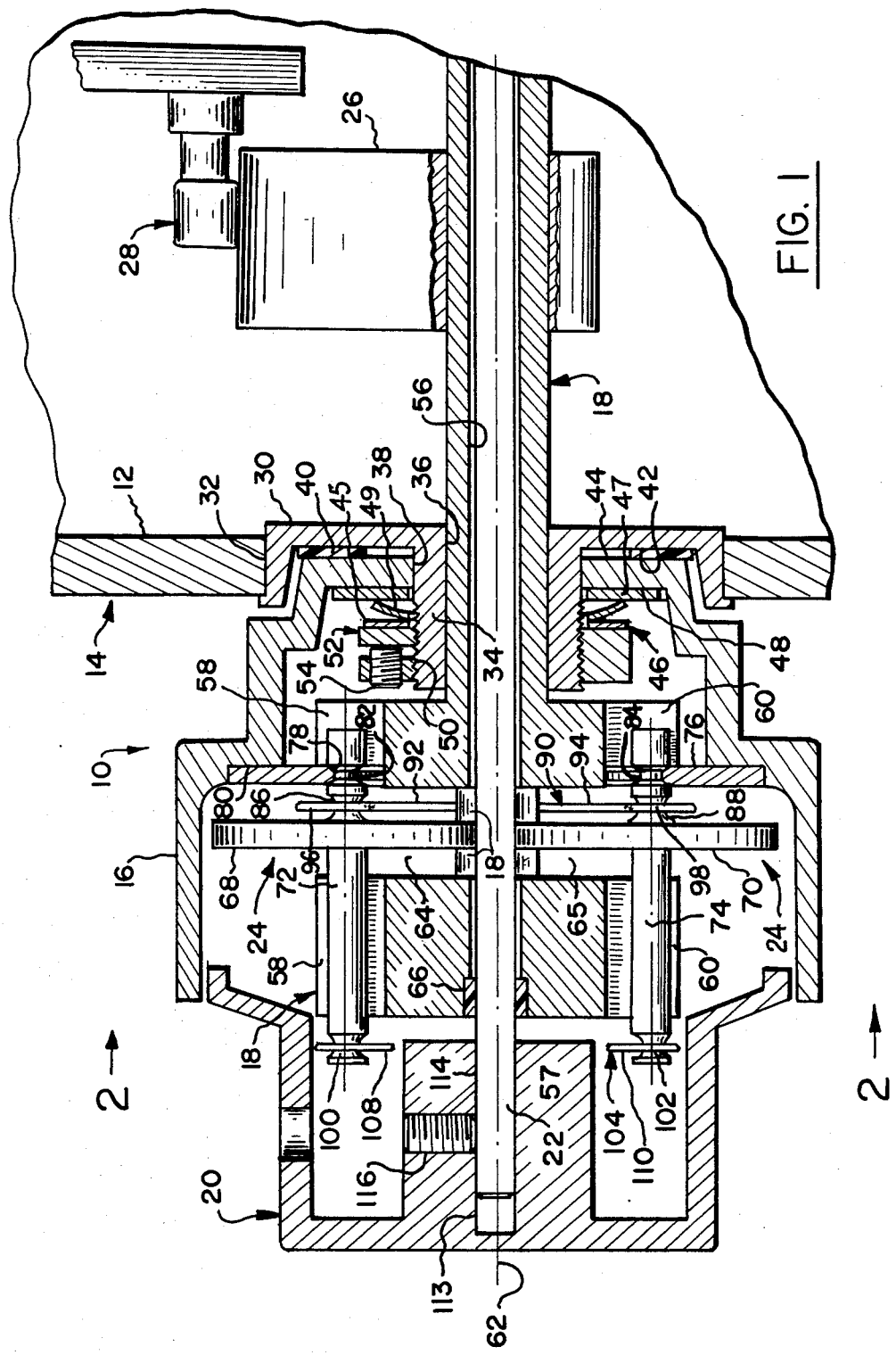
FIG. 1 is a partial side elevational view in section showing the coarse-fine adjusting apparatus according to the present invention.

The coarse-fine adjusting mechanism 10 is mounted to a support 12 of an optical instrument 14, such as a microscope. The mechanism 10 includes a coarse focus knob 16, a coarse focus shaft 18, a fine focus knob 20, a fine focus shaft 22 and a drive roller mechanism 24. A cam 26 is mounted to the coarse focus shaft 18 which engages a cam follower 28 which, in turn, is connected in a conventional manner (not shown) to a movable member, such as a stage or nosepiece (also not shown).

A bearing support collar 30 is mounted in aperture 32 of support 12. The collar has a boss 34 including a bore 36, which is sized to rotatably receive coarse focus shaft 18. Coarse focus knob 16 has aperture 38 which is sized to rotatably fit over boss 34 as illustrated in FIG. 1. A friction washer 40 is situated between surface 42 of bearing collar 30 and surface 44 of coarse knob 16. A spring and washer assembly 46 comprising a pair of washers 45 and 47 and a spring 49 is fitted over boss 34 and engages interior surface 48 of knob 16. Boss 34 has threaded portion 50 onto which a split nut 52 is assembled. The split nut 52 is tightened on boss 34 compressing the spring and washer assembly 46 which in turn forces the coarse knob 16 against friction washer 40. When the desired level of friction is achieved between the coarse knob 16 and friction washer 40, set screw 54 is tightened, which effectively locks the split nut 52 to boss 34.

Coarse focus shaft 18 is received in bore 36 of bearing collar 30. Shaft 18 has bore 56 which is slightly larger in diameter than the diameter of the fine focus shaft 22. By referring to FIGS. 1 and 3, it will be seen that the coarse shaft 18 has an enlarged axle supporting end portion 57 which has slots 58 and 60 formed therein. The slots 58 and 60 are parallel to axis 62. A second set of slots, 64 and 65, are formed in coarse shaft 18 transverse to slots 58 and 60. Fine focus shaft 22 is fitted to bore 56 of coarse shaft 18 and is supported by press fit bearings, one of which is shown at 66 in FIGS. 1 and 3. As is evident from FIGS. 2 and 3, opposing surface portions of shaft 22 are exposed by slots 64 and 65.

Figure 2:
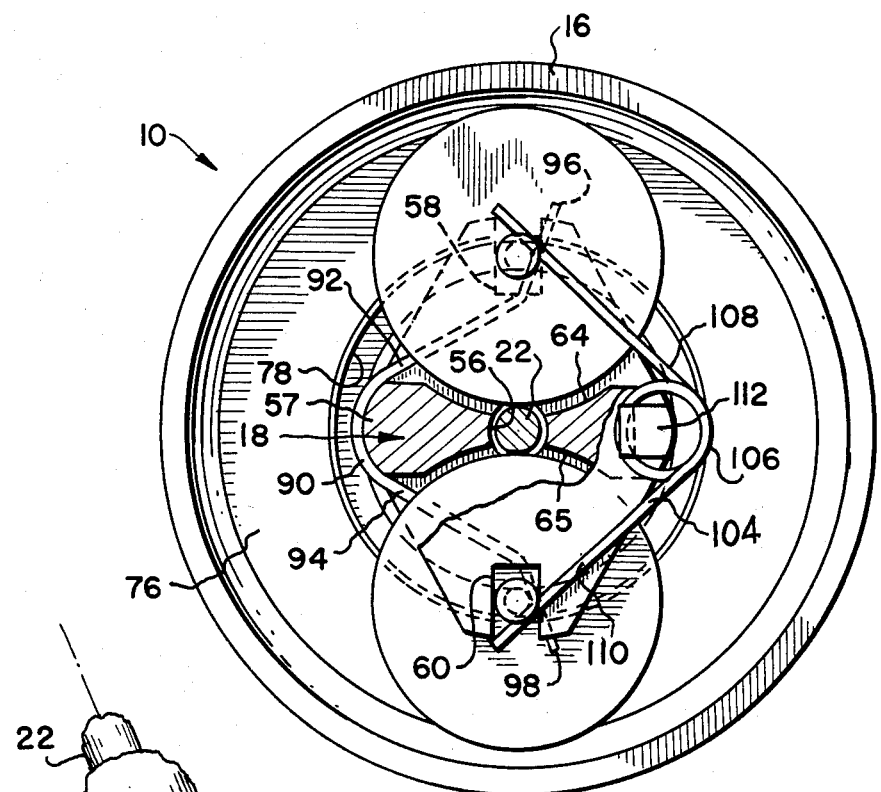
FIG. 2 is a view looking in the direction of arrows 2—2 of FIG. 1, with the fine adjustment knob removed for clarity.
Figure 3:
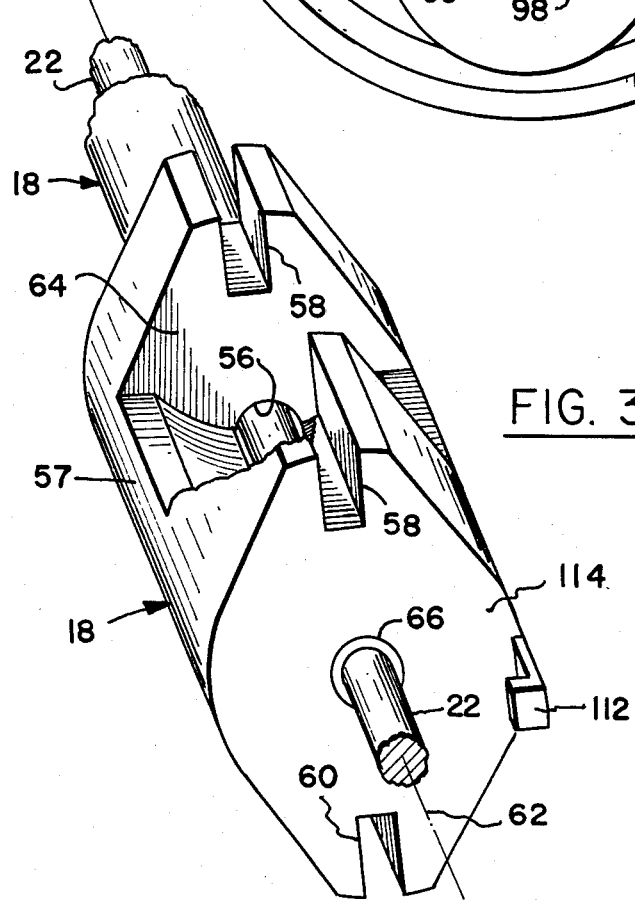
FIG. 3 is a partially broken away perspective view of the coarse and fine shafts.

The drive roller mechanism 24 comprises a pair of friction wheels 68 and 70 which are mounted to, respectively, axles 72 and 74. Axle 72 is slidably received in slot 58 of coarse shaft 18 such that friction wheel 68 is situated in aperture 64 and bears against fine shaft 22, as best seen in FIG. 2. Similarly, axle 74 is slidably received in slot 60 and friction wheel 70 in slot 65. As is also evident from FIG. 2, the friction wheel 70 bears against fine shaft 22.

A drive ring 76 having a beveled aperture 78 is affixed, for instance by staking, to interior surface 80 of coarse knob 16. Axles 72, 74 have, respectively, beveled grooves 82, 84, which are received within the beveled aperture 78 of drive ring 76. A radiused notch 86 is formed in axle 72 adjacent beveled groove 82. Similarly, axle 74 has a radiused notch 88 formed therein adjacent beveled groove 84.

As best illustrated in FIG. 2, a hairpin spring 90 having legs 92, 94 is positioned over coarse shaft 18. Curved end 96 of leg 92 is received in radiused notch 88 as best seen in FIG. 1. Similarly, curved end 98 of leg 94 is received in radiused notch 86. Spring 90 exerts a radial force against axles 72 and 74 which biases them against bevel 78 of drive ring 76 and slots 58 and 60 of coarse shaft 18. Backlash is thereby compensated for and removed from the system.

A second pair of radiused notches 100, 102 are formed in, respectively, axles 72, 74. As best illustrated in FIG. 2, a second hairpin spring 104 has a looped portion 106 and legs 108 and 110. The looped portion 106 is positioned over a notched post 112 formed on end 114 of coarse shaft 18. Leg 108 bears against radiused notch 100 while leg 110 bears against radiused notch 102. Hairpin spring 104 generates a downward force toward, essentially, the centerline 62 of the instrument to hold wheels 68 and 70 against fine shaft 22.

The fine focus knob 20 has a bore 113 which is slip fit over end 114 of fine focus shaft 22. Knob 20 may be secured to shaft 22 by means of set screw 116.

In operation, rotation of the coarse focus knob 16 directly rotates the coarse shaft 18. By referring to FIG. 1 it will be evident that rotation of the knob 18 rotates the drive ring 76. The axles 72 and 74, which are biased by spring 90 against the drive ring 76 also rotate. In turn, the axles, which are captured in slots 58 and 60, cause the coarse shaft 18 to rotate. Cam 26 which is mounted to coarse shaft 18 rotates directly and moves cam follower 28 and the focus adjusting mechanism connected thereto.

To accomplish fine focusing, knob 20 is rotated, which rotates shaft 22. Friction wheels 68 and 70, which are held against the shaft 22 are therefore also rotated. The axles 72 and 74 rotate with, respectively, the friction wheels 68 and 70. As the axles are engaged by drive ring 76 and held in slots 58 and 60 they, in turn, cause the coarse shaft 18 to rotate. As the coarse knob 16 is frictionally mounted to the support 12 it is prevented from rotating when the fine knob 20, is rotated. Drive ring 76 also remains stationary. Therefore, when the fine knob 20 is rotated the coarse knob 16 remains stationary and the friction wheels 68, 70 and axles 72, 74 rotate in a planetary fashion about the fine shaft 22. The coarse shaft 18 is therefore driven proportionately to the rotation of the fine knob 20 and fine adjustments are accomplished.

It is evident from inspection of the drawings that no stop mechanism is provided to limit the rotation of the fine adjusting knob and shaft. If resistance is encountered, the friction wheels 68 and 70 will slip on the fine shaft 22, thus acting as a safety clutch. Consequently, there is no need to provide such a stop. This has a definite advantage as there is no need to reset the coarse adjustment should the movement available by the fine mechanism be insufficient to accomplish focus. The fine mechanism shown herein may be used, if so desired, to drive the mechanism being adjusted through the entire range. Should any resistance be encountered, the drive roller mechanism 24 will slip.

While other certain embodiments of this invention have been shown and described in detail, it should be understood that there are other embodiments and modifications which could be made to the present invention without departing from the spirit or scope of the invention as set forth and defined in the appended claims.

I claim:

1. Apparatus for accomplishing coarse-fine adjustments in optical instruments, comprising:

a support member;

a coarse focus knob rotatably supported and frictionally engaged to said member, said knob having an internal bearing surface;

a coarse focus shaft coupled to said coarse focus knob, said shaft having first and second pair of slots defined therein for receiving and locating a pair of drive roller assemblies, said first pair of slots being formed longitudinally in said coarse focus shaft and said second pair of slots being formed transverse to said first pair of slots;

a fine focus shaft concentrically received in said coarse focus shaft, said coarse and fine shafts being coupled to a mechanism for translating rotary motion into linear motion;

a fine focus knob mounted to said fine focus shaft;

a pair of drive roller assemblies, each assembly including a friction wheel and an axle, said assemblies being received in said first and second pairs of slots such that said friction wheels engage said fine focus shaft and a portion of said axles engage said internal bearing surface of said coarse focus knob; and biasing means mounted between said coarse focus shaft and said pair of drive roller assemblies, said biasing means including first and second resilient members, said first resilient member biasing said friction wheels against said fine focus shaft and said axles against said coarse focus knob internal bearing surface, said second resilient member biasing said axles against said longitudinal slots in opposite directions of rotation to thereby remove backlash upon rotation of said fine shaft in either direction, said friction wheels being capable of slipping on said fine shaft when resistance is encountered by said translating mechanism.

2. The coarse-fine adjusting apparatus as set forth in claim 1, wherein said biasing means comprises a pair of springs.

3. The coarse-fine adjusting apparatus as set forth in claim 2, wherein at least one of said springs is a hairpin spring.

4. The coarse-fine adjusting apparatus as set forth in claim 3 wherein said hairpin spring is mounted to a post formed on said coarse focus shaft.

5. The coarse-fine adjusting apparatus as set forth in claim 2 wherein said coarse focus shaft includes means thereon for positioning said pair of springs.

6. The coarse-fine adjusting mechanism as set forth in claim 2 wherein each of said springs engages and forces each of said drive roller axles against said longitudinal slots to thereby prevent backlash and to provide driving forces for said drive roller friction wheels.

7. The coarse-fine adjusting apparatus as set forth in claim 1, where in said pair of transverse slots expose said fine focus shaft for engagement by said friction wheels.

8. The coarse-fine adjusting apparatus as set forth in claim 1 wherein said coarse focus knob internal bearing surface comprises a beveled ring and said drive roller axles include grooves which are received within said bevelled ring.

9. The coarse-fine adjusting apparatus as set forth in claim 1 wherein said longitudinal slots in said coarse focus shaft are formed approximately opposite each other.

* * * * *